United States Patent [19]

Liao

[11] Patent Number: 5,827,402
[45] Date of Patent: Oct. 27, 1998

[54] DRINKING WATER APPARATUS

[76] Inventor: Ben-Mo Liao, 3F., No. 8, Lane 593, Su-Yuan Rd., Hsin-Chuang City, Taipei County, Taiwan

[21] Appl. No.: 845,402

[22] Filed: Apr. 25, 1997

[51] Int. Cl.⁶ ................................ B01D 3/42; C02F 1/04
[52] U.S. Cl. ....................... 202/160; 202/181; 202/185.3; 202/186; 202/206; 203/1; 203/2; 203/4; 203/10; 203/87; 203/DIG. 18
[58] Field of Search ..................... 202/160, 186, 202/185.3, 182, 185.4, 202, 181, 193, 196, 206, 253; 203/1, 2, 10, DIG. 18, 100, 4, 87; 137/386, 391; 374/100, 141; 364/501; 219/490

[56] References Cited

U.S. PATENT DOCUMENTS

| | | | |
|---|---|---|---|
| 3,849,260 | 11/1974 | Ruckstuhl | 202/181 |
| 3,935,077 | 1/1976 | Dennison | 202/83 |
| 4,110,170 | 8/1978 | Kirschman et al. | 202/160 |
| 4,622,102 | 11/1986 | Diebel | 202/185.3 |
| 4,861,435 | 8/1989 | Sweet, Jr. | 202/180 |
| 4,906,337 | 3/1990 | Palmer | 202/160 |
| 4,933,046 | 6/1990 | May | 203/10 |
| 5,053,111 | 10/1991 | Ellerbe, Jr. | 203/1 |
| 5,059,287 | 10/1991 | Harkey, Sr. | 202/160 |
| 5,217,580 | 6/1993 | Chen | 203/10 |
| 5,348,623 | 9/1994 | Salmon | 202/160 |
| 5,679,274 | 10/1997 | Mahood | 219/492 |

OTHER PUBLICATIONS

Genesis, "Operator's Manual", 1993.

*Primary Examiner*—Virginia Manoharan
*Attorney, Agent, or Firm*—Morton J. Rosenberg; David I. Klein; Jun Y. Lee

[57] ABSTRACT

An improved drinking water apparatus is provided which utilizes a microcomputer to detect water level to automatically control water intake and heating. The apparatus includes a heating tank having a heater at the bottom side, a first cooling pipe at the top of the heating tank, a distilled water tank, and a second cooling pipe located at the top of the distilled water tank and connected to the first cooling pipe. The cooling pipes are each provided with a cooling fan for cooking the steam generated by boiling water into distilled water. The temperature of the distilled water is lowered to a degree suitable for drinking purposes.

1 Claim, 2 Drawing Sheets

DRINKING WATER APPARATUS

BACKGROUND OF THE INVENTION (a) Field of the Invention:

The present invention relates generally to an improved drinking water apparatus, and more particularly to a microcomputer controlled drinking water apparatus which can automatically sense the water level to thereby control automatic water intake and heating in which, steam generated by boiling water is cooled by two cooling pipe units into distilled water, which is stored in a distilled water tank and pumped out by use of a motor for drinking purposes.

(b) Description of the Prior Art:

In conventional drinking water apparatuses, generally, water is stored and boiled in a specific heating chamber. However, there are the following drawbacks with such conventional drinking water apparatuses:

1. The heating temperature is sensed by a temperature sensor. This manner of sensing may result in temperature error, so that heating is stopped before the boiling point is reached. Hence, chlorine cannot be effectively removed and sterilization cannot be achieve.
2. Whether or not the drinking water apparatus is of the type capable of reaching the boiling point, when tap water is conducted into the heating chamber, there is already some residual tap water left in the pipe. Long-term consumption will therefore affect the user's health.
3. For larger drinking water apparatuses such as drinking fountains in public places, although the tap water is filtered being heating, the filtration effect is questionable. Moreover, the filter has to be cleaned and replaced from time to time. If it is not duly replaced, germs and bacteria may breed therein, and water from the drinking water apparatus will be contaminated thereby.

SUMMARY OF THE INVENTION

A primary object of the present invention is to provide a drinking water apparatus in which, by sensing the water level and water temperature, automatic control of heating, water intake and cooling fans may be achieved.

Another object of the present invention is to provide a drinking water apparatus in which two cooling pipes with a respective cooling fan are provided to cool steam generated by the boiling water into distilled water of a suitable temperature so that the user's health is ensured.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
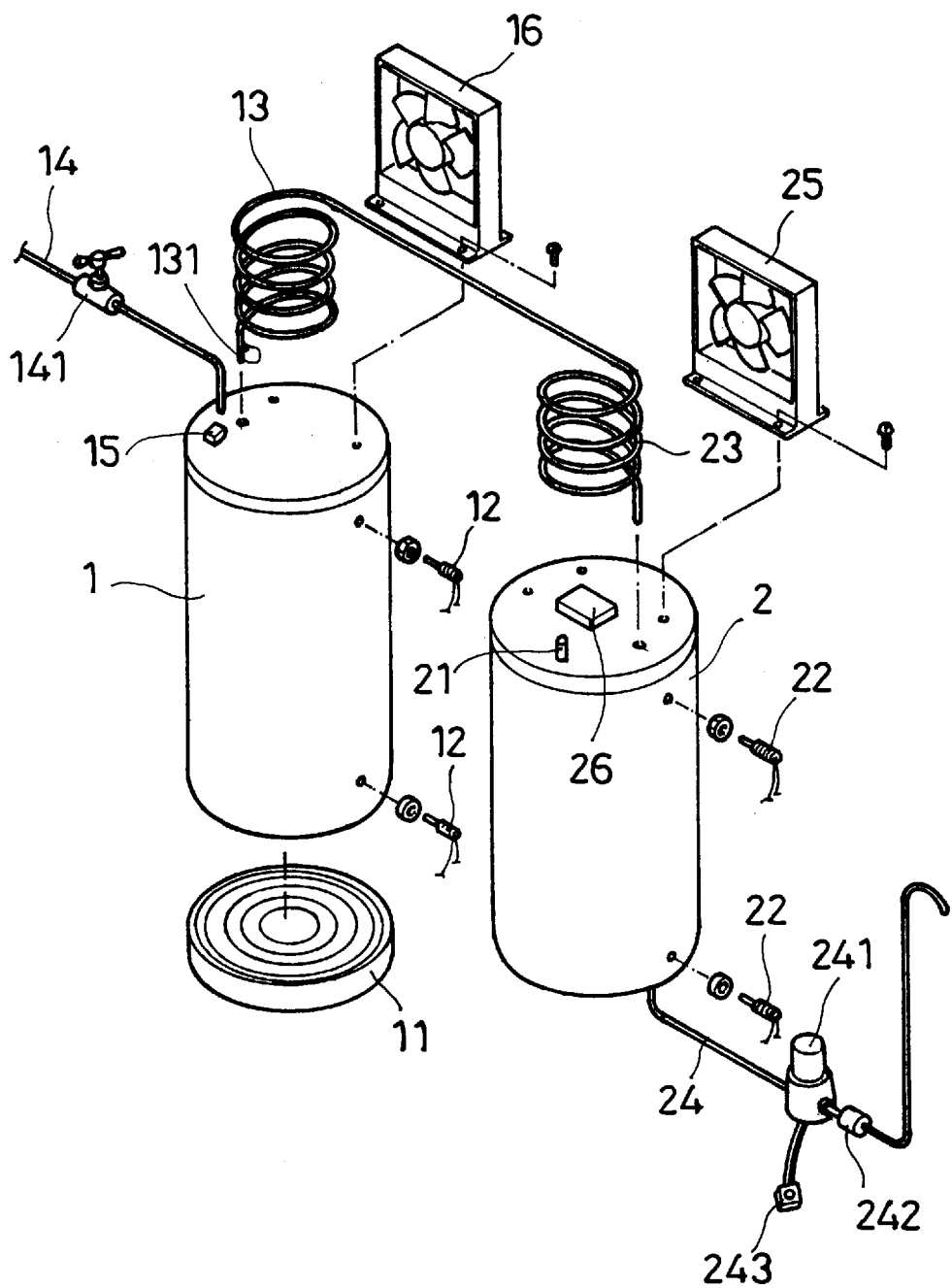
FIG. 1 is an exploded elevational view of the present invention.
Figures 2, 2A:
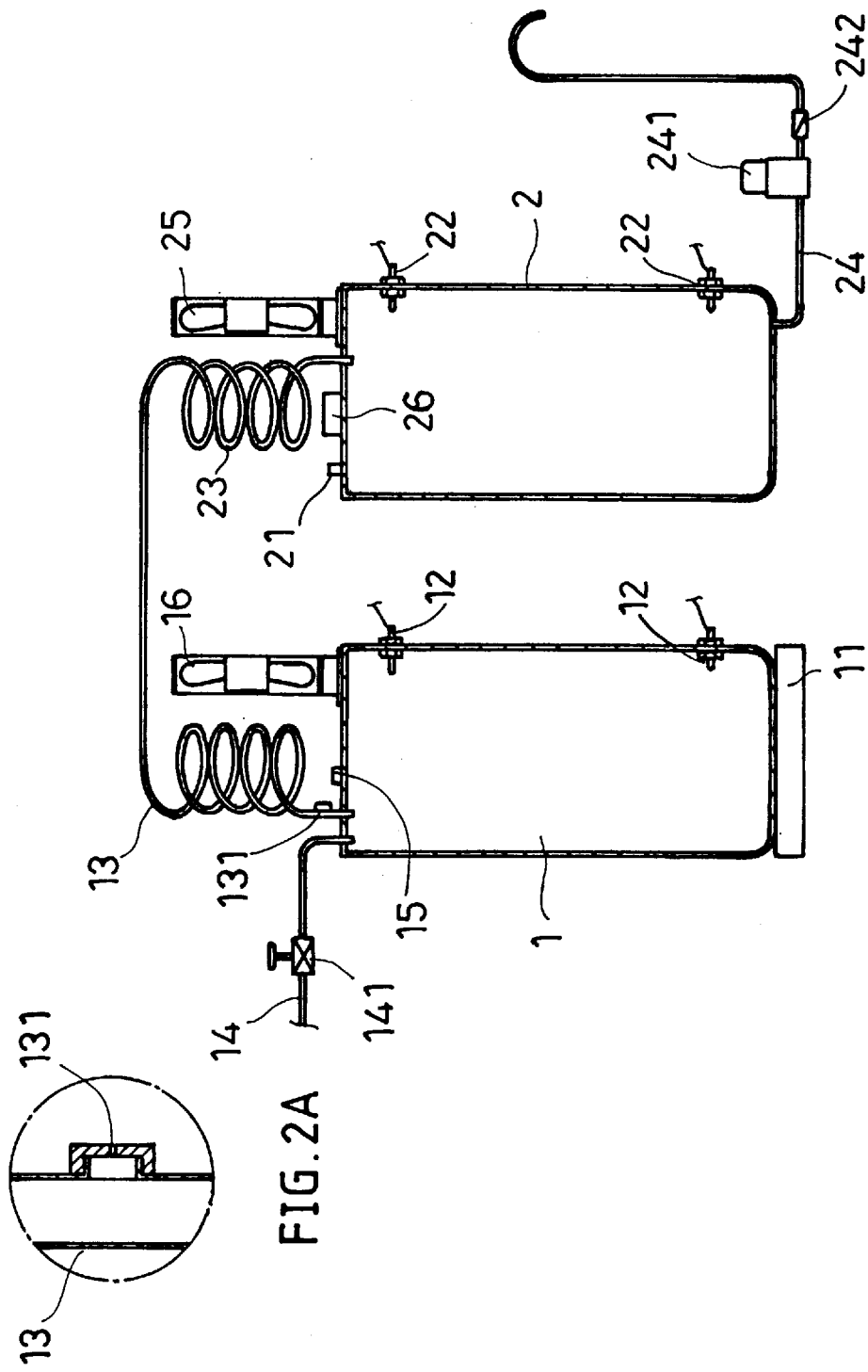
FIG. 2 is an assembled sectional view of the present invention.
FIG. 2A is an enlarged sectional view of the air vent of the first cooling pipe of the present invention.

With reference to FIGS. 1, 2, and 3A, the present invention essentially comprises a heating tank 1 having a heater 11 provided at the bottom thereof for heating the water in the heating tank until it boils. The steam thus generated is conducted into a first cooling pipe 13 located at the top of the heating tank 1 and having a cooling fan 16. One end of the first cooling pipe 13 is connected to a second cooling pipe 23 located at the top of a distilled water tank 2 and also having a cooling fan 25. Steam is cooled by the two cooling pipes 13 and 23, and the water thus distilled is collected and stored in the distilled water tank 2, and the temperature of the distilled water is lowered to one suitable for drinking. A water intake tube 14 is provided at one side of the top of the heating tank 1, and a water source control switch 141 is provided on the water intake tube 14 for controlling the intake of water. A temperature controlled fan switch 15 is further disposed at the top of the heating tank 1 for sensing the temperature in the heating tank 1, and a microcomputer 26 at the upper side of the distilled water tank 2 is provided for controlling the cooling fans 16 and 25. The heating tank 1 further has two water level sensing rod 12 at its upper end and lower end respectively. Likewise, the distilled water tank 2 is provided with two water level sensing rods 22 at the upper and lower ends thereof respectively. Based on the water levels detected by the respective sensing rods 12, 22, the microcomputer 26 controls the ON's and OFF's of the water source control switch 141 or the heater 11. The first cooling pipe 13 at the top of the heating tank 1 is provided with an air vent 131 through which chlorine removed from the water during the boiling process may escape. Likewise, the top of the distilled water tank 2 is provided with an air vent 21 for discharging hot air. In addition, the bottom end of the distilled water tank 2 is connected to a water supply pipe 24 having a motor 241 and a check valve 242. By pressing a control switch 243, the motor 241 is actuated to pump out the distilled water for drinking purposes.

In summary, the present invention provides an improved drinking water apparatus which is easy to operate, saves power, and achieves complete distillation of water.

Although the present invention has been illustrated and described with reference to the preferred embodiment thereof, it should be understood that it is in no way limited to the details of such embodiment but is capable of numerous modifications within the scope of the appended claims.

What is claimed is:

1. An improved drinking water apparatus, comprising:

a first tank for heating water therein;

a water intake pipe coupled in fluid communication with said first tank;

a water source control switch coupled in fluid communication with said water intake pipe for controlling water flow into said first tank;

a heater disposed at a bottom end of said tank for heating water therein to a temperature sufficiently high to boil the water;

a temperature sensor coupled to a top portion of said first tank for sensing an internal temperature thereof;

a pair of first water level sensing rods being coupled to said first tank in spaced relationship;

a second tank for accumulating distilled water therein;

a first cooling pipe coupled in fluid communication with said top portion of said first tank;

a first cooling fan disposed adjacent said first cooling pipe for directing a flow of air therepast;

a second cooling pipe having one coupled in fluid communication with a top portion of said second tank and an opposing end coupled in fluid communication with said first cooling pipe;

a second cooling fan disposed adjacent said second cooling pipe for directing a flow of air therepast;

a pair of second water level sensing rods being coupled to said second tank in spaced relationship;

a microprocessor having inputs coupled to said temperature sensor and said pairs of first and second water level sensing rods, said microprocessor having outputs coupled to said heater, said first and second cooling fans, and said water source control switch for (a) controlling operation of said first and second cooling fans, (b) controlling operation of said heater, and (c) turning said water source control switch on and off;

a first air vent coupled in fluid communication with said first cooling pipe for discharging chlorine released from water boiling in said first tank;

a second air vent coupled in fluid communication with said second cooling pipe for discharging hot air from said second tank; and, means for pumping distilled water from said second tank coupled to a bottom end portion thereof, said pumping means including a motor and a check valve coupled in fluid communication with a water supply pipe.

* * * * *